United States Patent [19]
Orsini

[11] Patent Number: 5,915,570
[45] Date of Patent: Jun. 29, 1999

[54] DRYWALL STAND

[76] Inventor: Milo N. Orsini, 2400 Clearview Dr., Glenshaw, Pa. 15116

[21] Appl. No.: 08/851,146

[22] Filed: May 5, 1997

[51] Int. Cl.⁶ .................................................. A47F 5/00
[52] U.S. Cl. ..................... 211/41.1; 211/41.14; 211/198
[58] Field of Search ................... 211/41.1, 198, 211/41.14, 41.15

[56] References Cited

U.S. PATENT DOCUMENTS

| | | | |
|---|---|---|---|
| 457,800 | 8/1891 | Standish | 211/198 X |
| 3,878,942 | 4/1975 | Hansen et al. | 211/41.14 X |
| 5,085,329 | 2/1992 | Crowell et al. | 211/41.1 X |
| 5,148,924 | 9/1992 | Mason et al. | 211/41.14 |
| 5,584,399 | 12/1996 | King | 211/41.15 |

*Primary Examiner*—Robert W. Gibson, Jr.
*Attorney, Agent, or Firm*—Carothers & Carothers

[57] ABSTRACT

A drywall stand for supporting a stack of drywall panels, standing on edge, inclined against each side of the stand. The drywall stand includes two support panels hingedly connected at their uppermost ends by a hinge plate, two pairs of intermediate links which allow the stand to be collapsible and a pair of base members which can be nailed to the floor. A pair of spaced apart stands may be connected by a pair of beams.

12 Claims, 2 Drawing Sheets

DRYWALL STAND

FIELD OF INVENTION

The present invention relates to providing a stand for supporting drywall panels.

BACKGROUND OF THE INVENTION

To prepare for the installation of drywall panels (sheetrock), installers typically lean the large bulky panels against existing walls or large objects. The panels must then be maneuvered around or moved from place to place so as not to obstruct the work of the drywall installers or technicians of other trades. An advantage therefore exists for a stand for conveniently supporting drywall panels.

SUMMARY OF THE INVENTION

In accordance with the present invention, drywall stands are provided for use by drywall installers for supporting panels of drywall.

Each drywall stand of the present invention includes two support panels hinged together to form an easle-like support. A pair of spaced apart drywall stands connected by a pair of beams is capable of supporting a stack of drywall panels, standing on edge, inclined against two sides of the pair of stands. However, a single stand may be used alone in some applications. Hingedly attached to the bottom of each support panel is a base member which during storage is folded up against its corresponding support panel. In use, each base member is unfolded so that it lies horizontally on the floor to provide stability to the stand. If possible, the base members can be nailed to the floor to provide extra stability.

BRIEF DESCRIPTION OF THE DRAWINGS

The invention will become more readily apparent from the following description of a preferred embodiment thereof shown, by way of example only, in the accompanying drawings, wherein.

DESCRIPTION OF THE INVENTION

Figure 1:
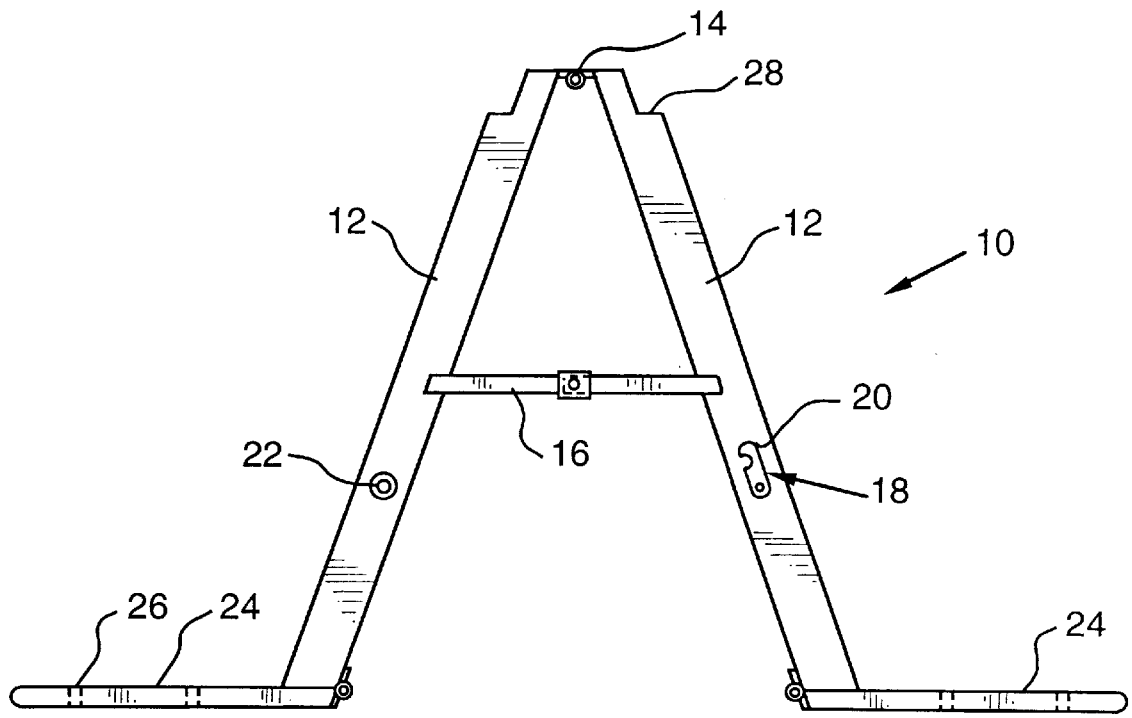
FIG. 1 is an end view of the drywall stand according to the preferred embodiment of the present invention.
Figure 2:
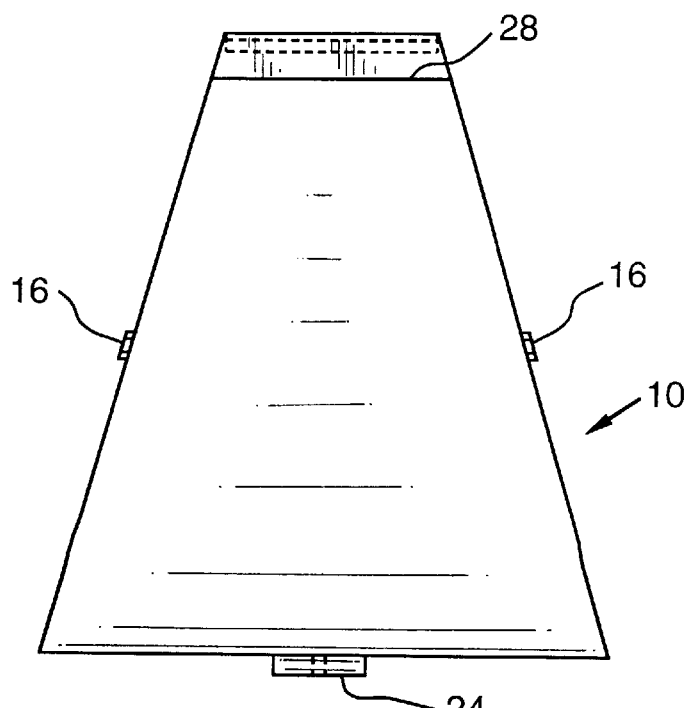
FIG. 2 is a side view of the drywall stand.

There is generally indicated at 10 in FIGS. 1 and 2 a drywall stand according to the present invention. The drywall stand includes two support panels 12 connected at their uppermost ends by a hinge 14 to allow the support panels to open and close for use and storage. Each support panel has the shape of a trapezoid having a bottom width wider than the top width for increased stability.

Two pairs of links 16 interconnect the edges of the central portions of the support panels 12. Each link is pivotally connected to the other link and to its respective support panel 12. The links 16 are designed to lock tight when opened and collapse when closed. Each stand 10 preferably has a locking means 18 for securing the collapsed stand in a closed position. The locking means 18 is preferably mounted on one edge of the stand and includes a pivoting lever clamp 20 mounted on one support panel 12 and a locking pin 22 on the other.

A base member 24 is hingedly attached to the center of the bottom of each support panel 12. The base members 24 are pivoted to a horizontal position, when in use, so that they lie on the floor. A stack of drywall panels, standing on edge, is then placed on top of respective base members 24 from a pair of drywall stands 10. However, the majority of the weight of the drywall panels is supported by the floor or ground. Nail holes 26 are preferably provided on the base members 24 so that the base members 24 can be nailed to the floor when possible to provide extra stability. For storage, the base members 24 are pivoted upwardly against the support panels 12, support panels 12 are pivoted towards each other about the hinge 14 and the pivoting lever clamp 20 is rotated to engage the locking pin 22.

Figure 3:
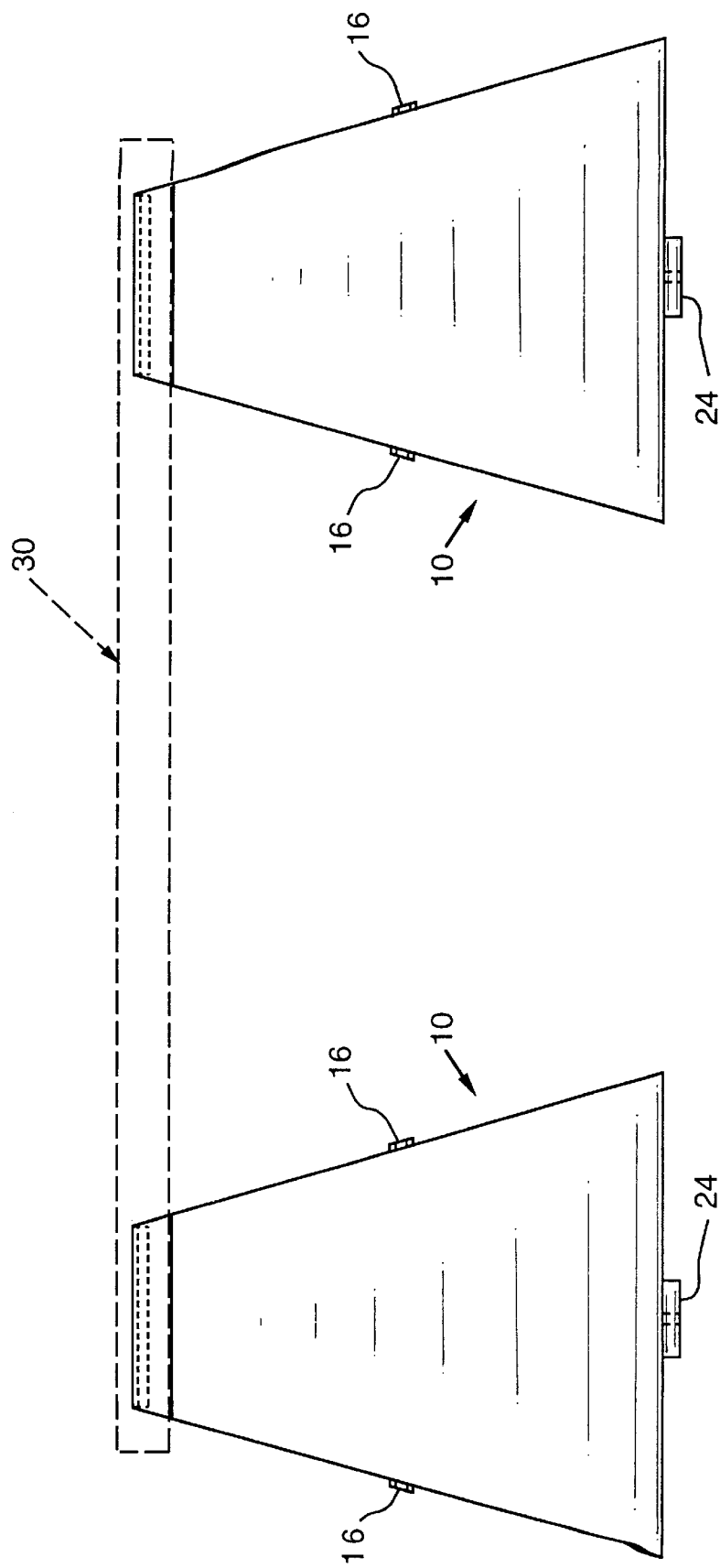
FIG. 3 is a side view of a pair of drywall stands with adjoining 2×4 inch lumber beams.

In use, a pair of drywall stands 10 is used to support a stack of drywall panels as shown in FIG. 3. It is possible for each pair of drywall stands 10 to support two stacks of drywall panels, one stack leaning against the associated support panels 12 of the pair of stands 10. To ensure proper positioning of the stands 10 and also to add additional support to the drywall panels, an L-shaped cut-out 28 is preferably provided at the top of each support panel 12 such that a 2×4 inch lumber beam 30 may be placed across respective support panels 12 of a pair of stands.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A stand for supporting at least one sheet-like panel, standing on edge, on the floor or ground comprising:

a first support panel adapted for supporting a stack of sheet-like panels, standing on edge, inclined thereof against;

a second support panel, coupled to said first support panel at their uppermost ends;

at least one base member means attached to the base of at least one of said support panels for providing stability to the stand and supporting a portion of the at least one sheet-like panel; and an upwardly open cut-away portion near the upper end of said stand for dropping in and supporting a beam.

2. The stand of claim 1 wherein the second support-panel is adapted for supporting at least one sheet-like panel, standing on edge, inclined thereof against.

3. The stand of claim 2 wherein one of the at least one base member means is pivotally attached to the base of each of said support panels.

4. The stand of claim 1 further comprising a hinge means for pivotally coupling said second support panel to said first support panel at their uppermost ends.

5. The stand of claim 1 wherein the at least one base member means includes means for attaching the stand to the floor.

6. The stand of claim 4 further comprising locking means for locking said first support panel against said second support panel.

7. A support apparatus for supporting at least one sheet-like panel, standing on edge, on the floor or ground comprising a pair of spaced apart stands connected by at least one beam, each stand comprising:

a first support panel adapted for supporting a stack of sheet-like panels, standing on edge, inclined thereof against said first support panel including a first L-shaped cut out portion at its uppermost end adapted to support one of said at least one beam;

a second support panel, coupled to said first support panel at their uppermost ends, said second support panel including a second L-shaped cut out portion at its uppermost end adapted to support another of said at least one beam;

at least one base member means attached to the base of at least one of said support panels for providing stability to the stand and supporting a portion of the at least one sheet-like panel.

8. The support apparatus of claim 7 wherein the second support-panel is adapted for supporting at least one sheet-like panel, standing on edge, inclined thereof against.

9. The support apparatus of claim 2 wherein one of the at least one base member means is pivotally attached to the base of each of said support panels.

10. The support apparatus of claim 7 further comprising a hinge means for pivotally coupling said second support panel to said first support panel at their uppermost ends.

11. The support apparatus of claim 7 wherein the at least one base member means includes means for attaching the stand to the floor.

12. The support apparatus of claim 10 further comprising locking means for locking said first support panel against said second support panel.

* * * * *